INVENTORS
GIANNI A. DOTTO
WALLACE L. LINN

ATTORNEY

INVENTORS
GIANNI A. DOTTO
WALLACE L. LINN
BY
ATTORNEY

INVENTORS
GIANNI A DOTTO
WALLACE L. LINN

ATTORNEY

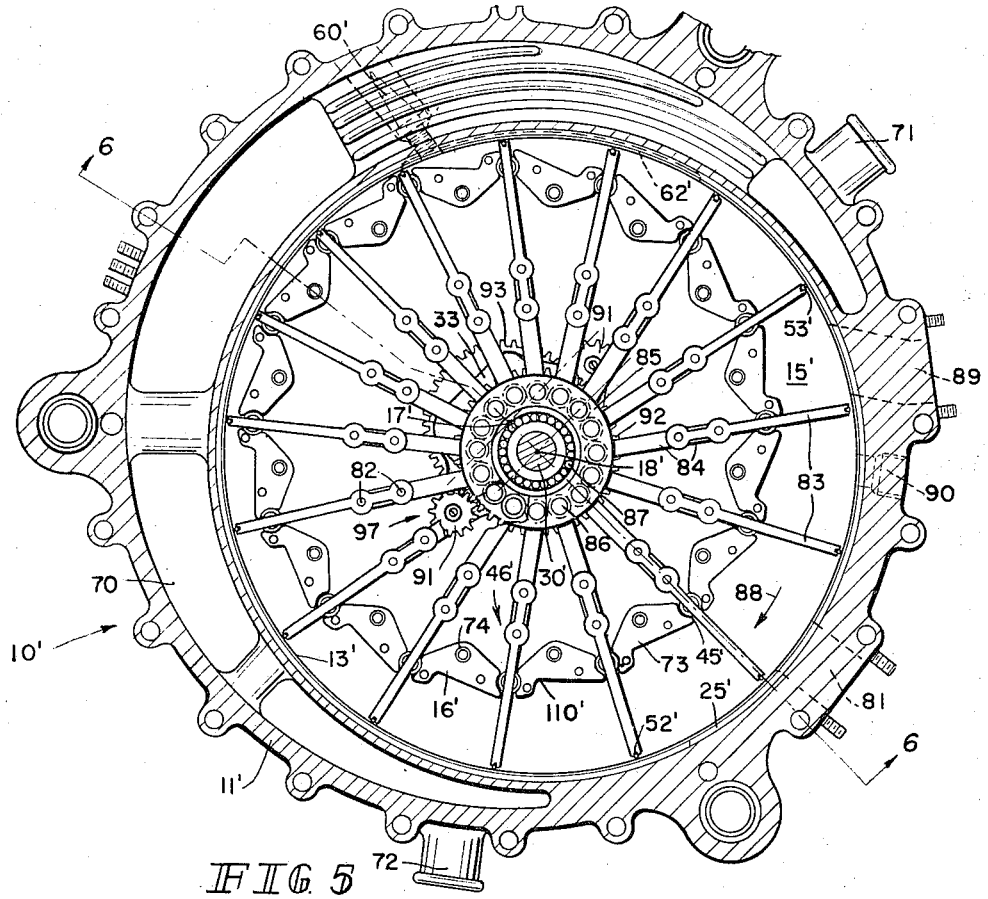
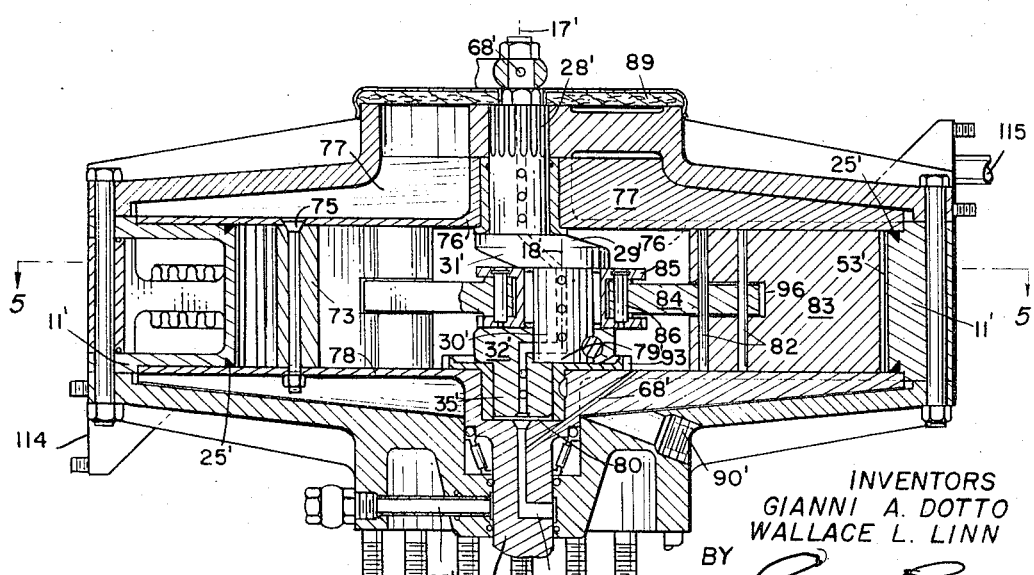

Jan. 31, 1967  G. A. DOTTO ET AL  3,301,233
ROTARY TYPE ENGINE

Filed Jan. 7, 1965  5 Sheets-Sheet 5

INVENTORS
GIANNI A. DOTTO
WALLACE L. LINN
BY
*Robert Levine*
ATTORNEY

United States Patent Office 3,301,233
Patented Jan. 31, 1967

3,301,233
ROTARY TYPE ENGINE
Gianni A. Dotto, Dayton, Ohio, and Wallace L. Linn, Indianapolis, Ind., assignors to P. R. Mallory & Co., Inc., Indianapolis, Ind., a corporation of Delaware
Filed Jan. 7, 1965, Ser. No. 424,105
22 Claims. (Cl. 123—16)

The present invention relates to an internal combustion engine, more particularly to a rotary internal combustion engine. The rotary internal combustion engine includes several novel means and methods such as continuous firing of an explosive fuel and air mixture in an explosion space thereby eliminating the need for a continuous spark or a continuous ignition system, vanes that ride in close proximity to an inner periphery of a cylinder, notched configurations in a rotor's periphery and slotted portions formed in the inner periphery of the cylinder to obtain a more advantageous mixture of fuel and air, combustion of the fuel and air mixture in a decompression portion of a firing cycle to thereby obtain a cooler running engine without sacrifice of horsepower developed by the novel rotary internal combustion engine, and a ring means or a camming surface and bearing cooperatively associated with each individual vane to predeterminately locate the vane with respect to the inner wall of the cylinder to thereby substantially reduce wear.

Rotary internal combustion engines are known and are successfully utilized to provide a driving means for tools, machines and any other types of machinery that demand a uniform and a constant output of energy in order to be efficiently actuated. The rotary internal combustion engine may be utilized as a means for propelling automotive means and would necessarily be equipped with a suitable transmission. Within the broad field of rotary internal combustion engines, the need exists for a light weight engine that is cooler running than is the conventional rotary internal combustion engine; the need exists for an internal combustion engine that eliminates the need for a means that develops a continuous ignition spark; and the need exists whereby the internal wear of the rotary internal combustion engine is substantially reduced thereby promoting greater engine efficiency and longer engine life.

Several presently available rotary internal combustion engines include vane means that engage with the cylinder wall thereby increasing wear at the point or points of engagement. Typically, these engines include a continuous spark ignition system for each pair of vanes substantially seal their associated portion of a circular cylinder. Several of the presently available rotary internal combustion engines ignite the fuel and air mixture during the compression portion of the cycle whereas the present invention provides a means for igniting the fuel and air mixture during the decompression portion of the cycle thereby allowing the engine of the present invention to operate at a substantially cooler temperature without any substantial sacrifice in power developed by the engine. It is seen that the present invention provides a simple, effective, and efficient rotary internal combustion engine. By the accompanying drawings and specifications, the novel means and method whereby the present invention fulfills the required purposes will be disclosed.

Therefore, it is an object of the present invention to provide a rotary internal combustion engine wherein the combustion of a fuel and air mixture occurs during a decompression portion of a cycle.

Another object of the present invention is to provide a rotary internal combustion engine including means wherein a plurality of vanes have their respective extremities retained in close proximity to but not engaging with an inner wall of a cylinder.

Still another object of the present invention is to provide a rotary internal combustion engine including means wherein the fuel and air mixture is more uniformly mixed to provide a mixture having more advantageous combustion characteristics.

Yet another object of the present invention is to provide a rotary internal combustion engine wherein the need for a continuous timing spark to ignite a fuel and air mixture is eliminated.

Another object of the present invention is to provide a novel rotary internal combustion engine having optimum reliability characteristics afforded by a compact construction having a minimum number of parts.

Still another object of the present invention is to provide a rotary internal combustion engine in which the radial movement of a plurality of vanes is more positively effected.

A further object of the present invention is to provide a rotary internal combustion engine having provision for adequate lubrication thereby maintaining the motor substantially cool.

Yet another object of the present invention is to provide a rotary internal combustion engine having a plurality of vanes in an elliptical working chamber having the characteristic of economy.

Another object of the present invention is to provide a rotary internal combustion engine having increased structural strength which substantially eliminates the stresses and strains encountered with the reciprocating internal combustion engine.

Still another object of the present invention is to provide a rotary internal combustion engine having increased serviceability characteristics and having a minimum number of moving parts.

Yet another object of the present invention is to provide a rotary internal combustion engine that requires a small amount of fuel and air mixture for the output power produced and that produces little vibration while operating.

A further object of the present invention is to provide a rotary internal combustion engine that utilizes a blower means for super-charging a fuel and air mixture prior to the mixtures entry into the engine.

Still another object of the present invention is to provide a simple, efficient, and practical rotary internal combustion engine.

Another object of the present invention is to provide a rotary internal combustion engine wherein a rotor means includes a plurality of spaced peripheral notches for further mixing an explosive mixture and for reducing the compression ratio of the engine.

Yet another object of the present invention is to provide a rotary internal combustion engine having an outlet means and a vacuum exhaust means for vacuum scavenging a residue of a combusted mixture present within the engine.

Still another object of the present invention is to provide a rotary internal combustion engine including a synchronizing means for synchronizing the rotational displacement of a rotor means and associated ring and vanes.

The present invention in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel combination, arrangement and cooperation of elements as hereinafter described and more particularly as defined in the appended claims.

The appended drawings illustrate the preferred embodiments of the present invention constructed to function in the most advantageous modes devised for the practical application of the basic principles involved in the hereinafter described invention.

FIGURE 5 is a top view of an embodiment of the present invention taken across lines 5—5 of FIGURE 6 illustrating a novel rotor and vane structure.

FIGURE 6 is a side view of the embodiment taken across the lines 6—6 of FIGURE 5 illustrating the interrelationship of the working parts of the rotary internal combustion engine.

Figure 1:
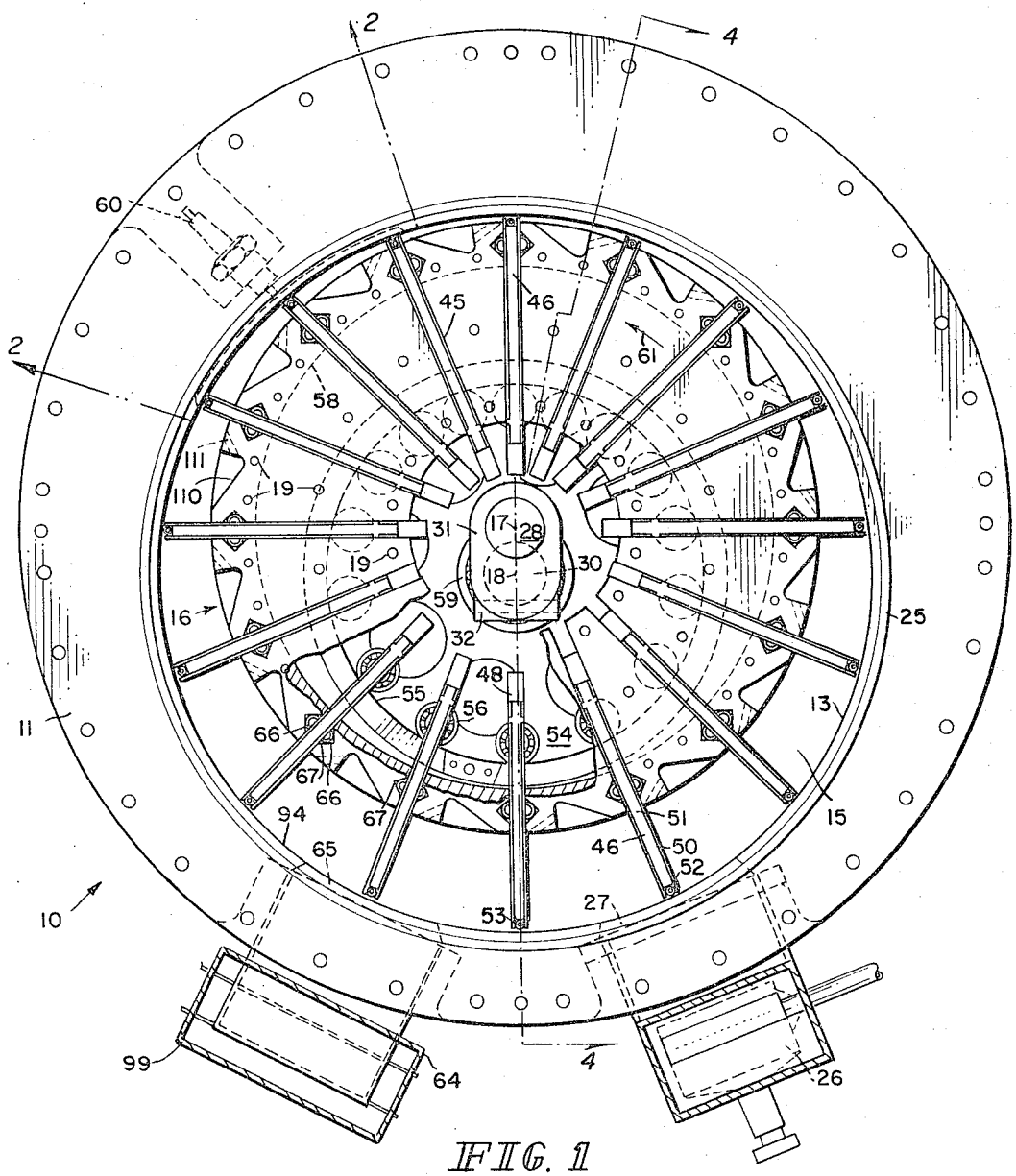
FIGURE 1 is a top view of the novel rotary internal combustion motor with sections thereof partially cut away wherein the top view illustrates the various parts of the engine and their cooperative relationship to other parts of the engine.

The present invention describes means for continuously igniting an air-fuel mixture in which a continuous spark system becomes unnecessary. In the present system the constant firing in the explosion chamber is done by a multiplicity of notches and includes a vacuum type of exhaust mechanism for scavenging the exhaust gases.

Functionally and constructively a camming means and bearing surfaces co-operate with the vanes by riding on cam tracks and by so doing are predeterminately positioned in relationship to the inner wall of the cylinder. Further the invention discloses an engine having a stationary singly overhung crank. As a result thereof, the driveshaft of the engine is directly coupled to the sealing means closing either extremity of the engine. A second embodiment of the aforesaid invention is constructed for pivotally coupling the vanes of the motor to the ring means. This establishes a more efficient balancing of the operating parts of the engine and substantially reduces causes for wear, therein and hence lessens the cocking effect of the vane means by presenting a tangential relationship to the inner wall of this. Additionally by the construction and novel cooperation of the components of the engine and since the engine fires on the decompression portion of the firing cycle, a cooler operation of the engine is afforded without sacrifice of power. Again, the peripheral notches allow for more uniform mixture of fuel and air. These notches also reduce untoward effects of the compression ratio of the motor.

A second embodiment of the invention further includes means for synchronizing the rotational displacement of the rotor means and a ring of the engine, so as to increase the efficiency of the engine by preventing cocking of the vanes during acceleration and deceleration of the motor.

Generally speaking the means and method of the present invention relates to a novel rotary internal combustion engine. The engine includes a hollow cylindrical means having an elliptical shaped inner wall. The axis of the inner wall is eccentric with the cylindrical means. A stationary single overhung crank means includes a crank shaft means mounted eccentrically in the cylindrical means and an offset portion thereof is mounted concentrically in the cylindrical means. A rotor means is mounted concentrically in the cylindrical means so that the rotor means has as its axis, the axis of the offset portion of the crank means. The rotor means includes a plurality of spaced peripheral notches and associated plurality of apertures for further mixing an explosive mixture and for reducing the compression ratio of the engine. A plurality of sealing means are fixedly connected to ends of the rotor means so that a sealing means overlies each extremity of the cylindrical means. A work chamber is formed by the cooperative relationship of the rotor means and the inner wall. The work chamber is effectively divided into several spaces including a compression space, a decompression space, an explosion space, an expansion space, and an exhaust space. A plurality of spaced radial slots are carried by the rotor means. Vanes are slidably carried in the radial slots, the vanes including tips. A means is rotatably journalled to the crank shaft for maintaining the tips of the vanes predeterminately spaced from the inner wall. Interfitting with the tip of each of the vanes is a tubing means which rides in close proximity to the inner wall to thereby effectively prevent gas from leaking between the innerwall and the tip of the vane. An inlet means communicates with the compression space thereby allowing an explosive mixture to enter the compression space through the inlet means. The mixture is compressed by rotational displacement of the rotor means and cooperatively associated vanes. Further rotational displacement of the rotor means and the cooperatively associated vanes causes the mixture to be slightly decompressed and ignited. A plurality of arcuate slots are formed in the inner wall for maintaining continuous ignition of the explosive mixture within the explosion space. The ignited mixture expands into the expansion space against an increased surface area of the vanes thereby causing additional rotational displacement of the rotor and said cooperatively associated vanes. An outlet means and a vacuum exhaust means communicate with the exhaust space for vacuum scavenging a residue of the mixture present within the exhaust space.

One embodiment of the present invention utilizes the cooperative relationship between a camming means and bearing means to predeterminately space the tips of the vanes from inner wall. More particularly, a radial recess is formed within the rotor means. The camming means is rotatably journalled to the crank shaft and carried within the radial recess of the rotor means. The camming means is eccentrically mounted in the cylindrical means. The camming means includes a plurality of cam tracks. A plurality of bearing means are fixedly coupled to the vane means. The bearing means ride on the cam tracks thereby predeterminately spacing the tips of the vanes from the inner wall.

A second embodiment of the present invention utilizes a ring means rotatably journalled to the crank shaft for maintaining the tips of the vanes predeterminately spaced from the inner wall. The ring means includes peg means pivotably coupling the plurality of vanes to the ring means. The second embodiment also includes a synchronizing means for synchronizing the rotational displacement of the rotor means and the ring means.

Figure 4:
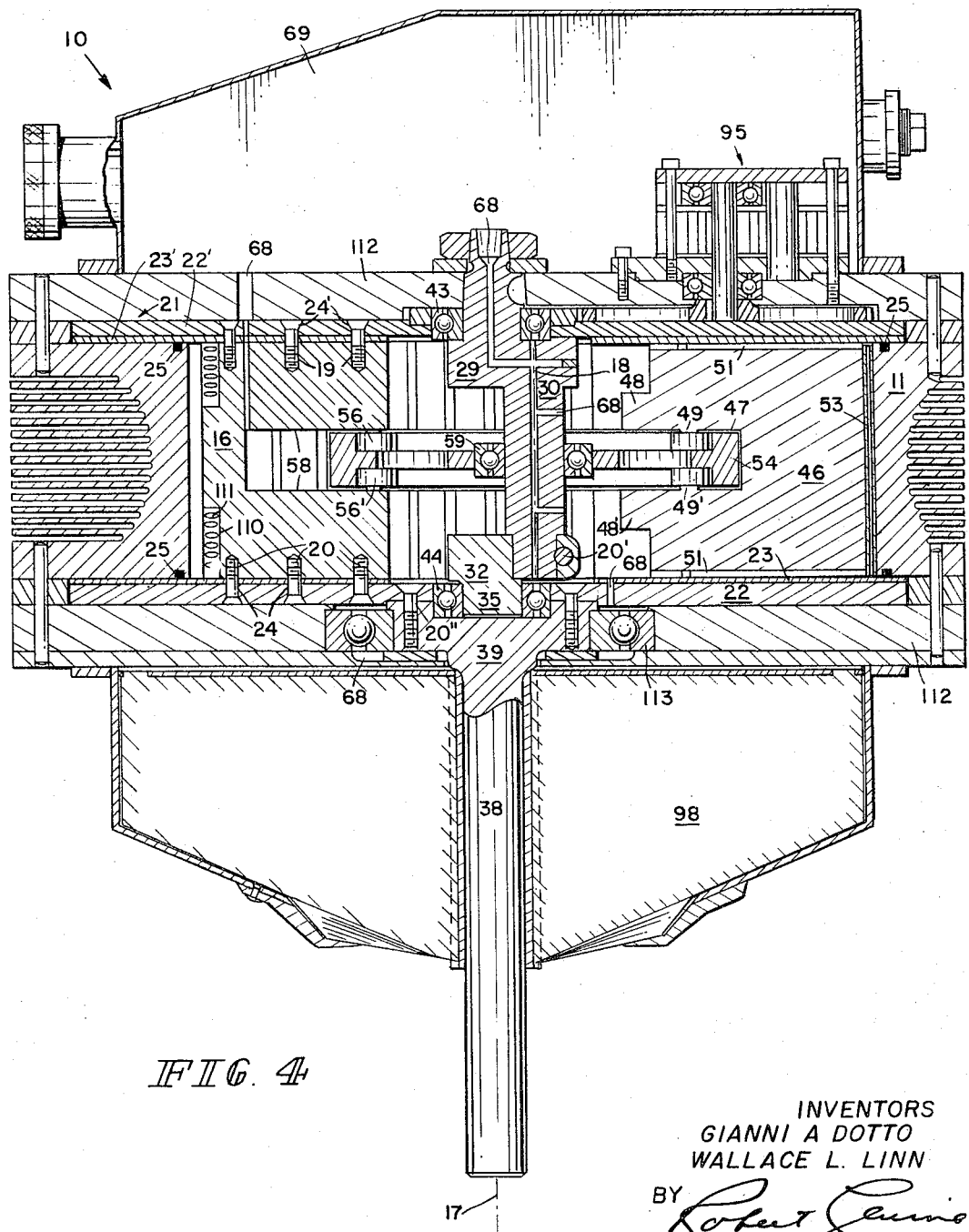
FIGURE 4 is a side view of the present invention taken across the lines 4—4 in FIGURE 1 illustrating the working relationship of various parts of the rotary internal combustion engine.

Referring now to the drawings, which illustrate the preferred embodiments of the present invention, the rotary internal combustion engine is generally indicated by numeral 10. The engine is suitably mounted on a support member as illustrated in FIGURE 4 by utilizing any acceptable and conventional manner such as mounting means 112. The engine includes an apertured, cylindrical shaped means 11 fabricated from a suitable metal or metal alloy capable of withstanding high temperatures and having good wear resistance such as an alloy metal sold under the trademark Mallory 3, or specially treated aluminum, or the like. The cylindrical means has a plurality of slots 12 formed therein extending from the outermost peripheral surface of the cylindrical means to a point near the inner wall 13 of the cylindrical means. A plurality of air cooling fins 14 are formed by the plurality of slots 12 on the outer periphery of the cylindrical means. It is seen that the plurality of air cooling fins provide a means and method whereby the amount of surface area of the cylindrical means exposed to air is significantly increased thereby allowing increased heat dissipation of heat generated during the operation of the engine.

Figure 3:
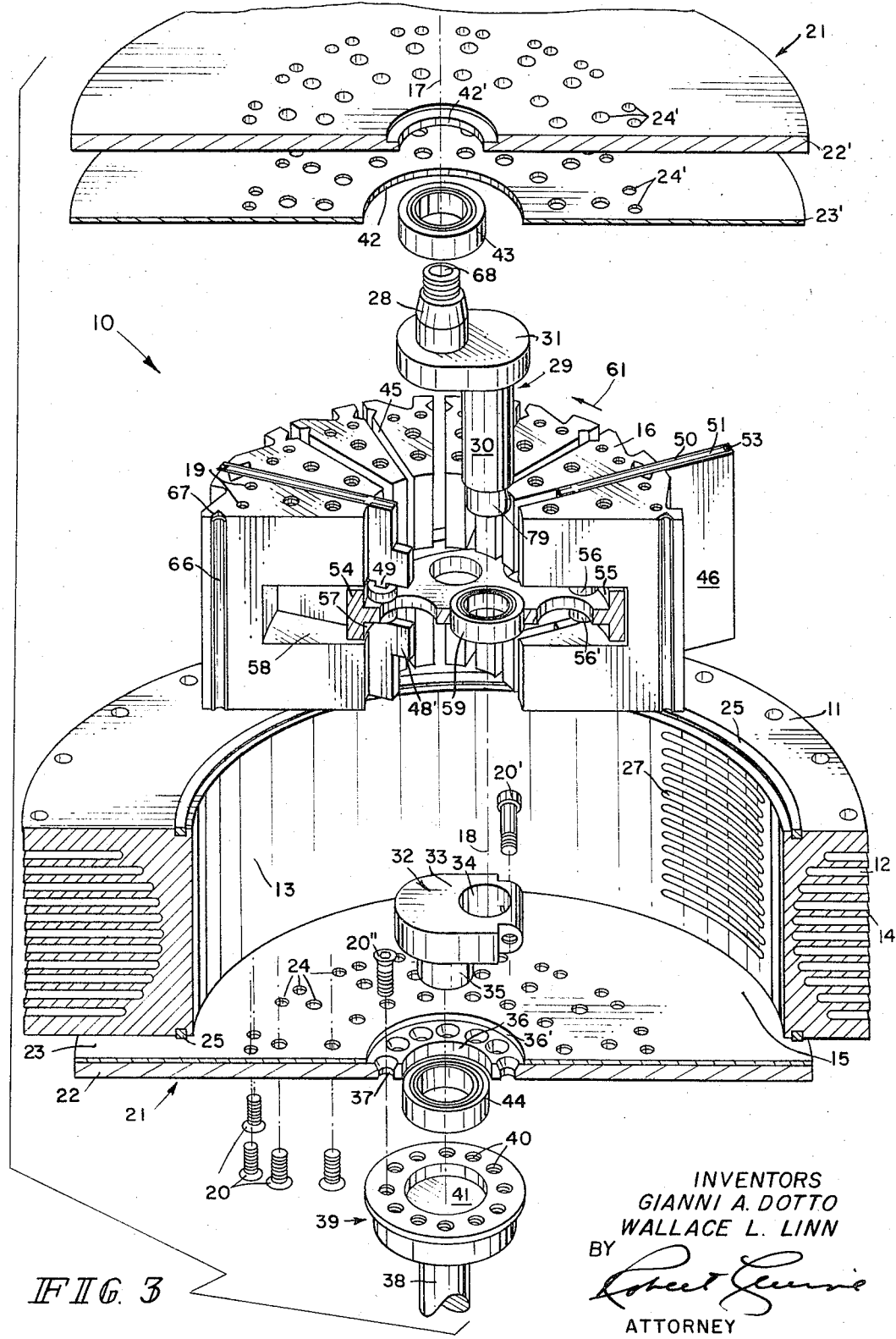
FIGURE 3 is a partial perspective view of the present invention illustrating the interrelationship of various parts of the rotary internal combustion engine.

The inner wall 13 of the cylindrical means is formed so as to be slightly elliptical in shape for reasons discussed herein, later. The inner wall has a lining 94 of suitable wear and heat resistant metal such as stainless steel. A work chamber 15 is formed by the inner wall 13 of the cylindrical means and the periphery of rotor means 16. Rotatably mounted within the elliptical space of the cylindrical means is rotor means 16. The rotor means rotates about axis 17 which is offset from axis 18 of the inner wall and which is the axis of a plurality of vanes 46. The offset of the aforementioned axes is in an eccentric manner. The rotor means has formed therein a plurality of threaded recesses 19 parallel to but spaced from the axis of the rotor means. The threaded recesses receive therein a fastening bolt 20 of a plurality of fastening bolts. A sealing means 21 is located at each extremity of the cylindrical means thereby effectively enclosing the extremities of the cylindrical means. The sealing means includes a first plate 22 fabricated from any suitable metal such as aluminum or the like and an overlying second plate 23 fabricated from any suitable metal such as stainless steel or the like. Each plate has therein a plurality of apertures 24 formed therein. A bolt 20 interfits and projects through its respective aperture so as to mate with its cooperatively associated threaded recess 19. As the bolts 20 are turned into threaded recesses 19 it is seen that the sealing means becomes effectively a part of the rotor means. Thus, as the rotor means is displaced in a rotational fashion, the respective sealing means will be rotationally displaced therewith. As a direct result of fastening the sealing means to the rotor means and due to the fact that the radius of sealing means 21 is greater than the radius of the inner surface, the respective sealing means are biased against a resilient sealing ring 25 seated in the cylindrical shaped means as illustrated in FIGURE 3. A resilient sealing ring is positioned at opposite ends of the cylindrical means. The rings are fabricated from any suitable resilient material such as cast iron or the like.

The respective sealing rings are utilized to effectively prevent undesirable foreign matter such as gases or dirt or other deleterious matter from entering the working chamber and also to provide a controlled condition under which combustion of a fuel and air mixture takes place.

As disclosed hereinbefore, the rotary internal combustion engine provides a means and method of effecting compression of the fuel and air mixture, thereafter allowing slight expansion of the compressed gases, igniting and exploding the fuel-air mixture and utilization of the expansive force generated by the exploding of the fuel and air mixture.

The axis 17 about which the rotor means rotates is formed by the axis of offset portion 28 of a stationary single overhung crank 29. The axis of crank shaft 30 provides an axis 18 about which the elliptical work chamber is formed. The offset portion of the crank and the crank shaft are fixedly coupled by web 31 to form the unitary crank. The crank is fabricated from any suitable metal such as stainless steel or the like. A seat means 32 includes a portion 33 having a recess 34 which interfits with extremity 79 of the crank shaft. A bolt 20' interfits with a threaded aperture of portion 33 so that as bolt 20' is tightened into the threaded aperture, seat 32 is fixedly coupled to the crank. Pin 35 of the seat is eccentric with respect to the axis of the crank shaft. Pin 35 projects through apertures 36 and 36' of the plates 22 and 23 respectively.

A plurality of apertures 37 are formed in plate 22 and are circumferentially located about centrally positioned aperture 36 of plate 22. Along the axis of the centrally located aperture lies the axis of drive shaft 38. A disc-shaped means 39 is integrally formed with the drive shaft on an extremity thereof. The location of the disc-shaped means and the drive shaft are illustrated in FIGURE 3 of the drawings. A plurality of threaded recesses 40 are circumferentially formed in the disc-shaped means. A recess 41 of predetermined depth is centrally located on the disc shaped means. The plurality of apertures 37 located about aperture 36 overlie the threaded apertures of the disc-shaped means. Bolts 20" interfit with and project through their respective apertures 37. The bolts 20" are tightened into their respective threaded recesses 40 thereby fixedly coupling plate 22 to the drive shaft. It is seen that arcuate displacement of plate 22 will cause a similar arcuate displacement of the drive shaft. The drive shaft is rotatably journalled to one of mounting means 112 by bearing means 113 as illustrated in FIGURE 4.

Pin 35 of seat 32 is positioned within recess 41 of the disc-shaped means. However, it will be noted that the seat is not fixedly coupled to the pin therefore, the drive shaft rotates independently of the influence of the seat and rotates independently of the influence of the stationary crank.

Offset portion 28 of the stationary crank projects through centrally located aperture 42 of plate 23' and centrally located aperture 42' of plate 22'. Plate 22' overlies plate 23'. Plate 22' is fabricated from any suitable metal such as aluminum or the like. Plate 23' is fabricated from any suitable metal such as stainless steel. Bearing 43 interfits between offset portion 28 of the crank and plate 22' so that plate 22' can rotate substantially free of the crank yet the crank provides axial support to the plate 22' and to plate 23'. Bearing 44 interfits between pin 35 and the walls of recess 41 of the disc-shaped means and plate 22 so that the plate 22 and the drive shaft rotate substantially free of the seat of the crank, yet provide axial support for the drive shaft and plate 22.

A carburetor means 26 and a blower means 98 are fixedly coupled together by any suitable means such as conduit 99. The carburetor means and the blower means are utilized to provide an adequate proportion of a fuel and air mixture to the engine under an initial pressure. The partially compressed fuel and air mixture enters the working chamber of the engine through a plurality of arcuate slots 27 formed in the inner wall. The plurality of slots are each of predetermined arcuate length. The carburetor means and the blower means are fixedly coupled to the engine by any suitable fastening means such as bolts (not shown) or other appropriate fastening means.

Rotor 19 is positioned within the elliptical work chamber in an eccentric manner with respect to the longitudinal axis of the work chamber. As illustrated in FIGURES 1 and 3, the rotor has formed therein a plurality of radial slots 45. The drawings illustrate 16 radial slots but it will be understood that the number of slots may be varied without departing from the scope of the novel invention. 16 radial slots have been shown as a mere matter of convenience to facilitate the description of the present invention. Operatively associated with each slot in the rotor is a vane 46. The vanes slide in their respective slots in accordance with their arcuate position with respect to the inner wall. Each vane is of predetermined length and is fabricated so as to exceed the total length of its associated slot for reasons appearing hereinafter.

The rotor means includes a plurality of spaced peripheral notches 110 for further mixing the explosive fuel and air mixture and for maintaining the compression ratio of the engine so that the compression ratio does not exceed a determined limit. Apertures 111 of the rotor means also serve to further mix the fuel and air mixture. FIGURE 1 illustrates the location of the plurality of apertures in the rotor means.

One of the preferred constructions of the vanes appears in FIGURES 1, 3 and 4. Each vane is integrally fabricated from any suitable metal such as a titanium, aluminum, machine steel, or the like. Each vane has formed therein a recess portion 47 of predetermined extent that is centrally located at the longitudinal axis thereof. A horizontal flange 48 and a horizontal flange 48′ are formed on opposite sides of the recess portion 47. Projecting downwardly from vane 46 into the recess portion 47 is vertical flange 49. Projecting upwardly from vane 46 into the recess portion 47 is vertical flange 49′. Each vane along its uppermost and lowermost horizontal side has recessed therein a T-shaped slot 50 that extends the entire length of each side of the vane. A T-shaped means 51 fabricated from any suitable, resilient metal such as stainless steel or the like, interfits with and is retained by the T-shaped slot to provide a sliding sealing means between its associated vane and plate 23 or plate 23′.

It will be observed that there is a small clearance between vertical tip 52 of the vane and the wall of the working chamber. The tips or extremities of the vanes do not engage the wall of the working chamber. A tubing 53 interfits with and is retained in place by a recess of the vane. The tubing is fabricated from any suitable material such as stainless steel or the like. The purpose of the tubing is to ride in close proximity to the inner wall to thereby effectively seal the area between the tip of the vane and the inner wall so that substantially no leakage of gases occurs through this area.

A camming means 54 is shown in FIGURES 1, 3 and 4. The camming means is circular shaped from the top view and substantially T-shaped in the cross sectional view. As illustrated in FIGURE 3, two separate and distinct cam tracks are formed in the camming means. A first cam track 55 provides a surface upon which a plurality of bearings 56 ride. It is seen that bearing 56 is press fitted to flange 49 of the vane. A second cam track 57 provides a second surface upon which a plurality of bearings 56′ ride. A bearing 56′ is cooperatively associated with each flange 49′ by any suitable means such as press fitting. The respective cam tracks are circular in shape about axis 18. The cam track interfits with recess 58 of the rotor. It is seen that the centrifugal force developed by the operating engine is sufficient to maintain the bearings of the vanes engaged with the cam tracks of the camming means.

Recess 58 serves to predeterminately locate the camming means in the vertical plane of the rotor means as illustrated in FIGURE 3. It will be noted that recess 58 is circular in shape and has as its axis, axis 17. Axis 18, the axis of the crank shaft, serves to locate the camming means in the horizontal plane of the rotor as illustrated in FIGURE 3.

Figure 2:
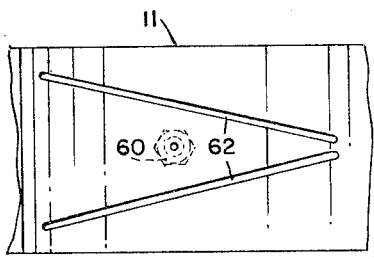
FIGURE 2 is a partial view of the cylinder inner wall taken across the lines 2—2 of FIGURE 1 illustrating an arcuate slotted section which serves to add turbulance to the fuel and air mixture thereby effecting a more advantageous fuel and air mixture and which provides channels for allowing continuous ignition of fuel and air mixture in the explosion space of the work chamber.

A bearing 59 serves to rotatably couple the camming means to crank shaft 30. As disclosed hereinbefore, the crank and parts fixedly coupled thereto do not rotate but rather are stationary with respect to the moving parts of the rotary internal combustion engine. Due to the eccentric mounting the rotor means within the cylindrical shaped means, the length of the vanes and the position of cam tracks of the camming means it is seen that the vanes do not contact and therefore do not ride against inner wall 13 as is done in several presently available rotary internal combustion engines. The vanes ride in close proximity to the inner wall 13 thereby achieving substantially the same result as the vanes of several presently available devices without the wear experienced by these devices and without any substantial loss of power developed by the operating engine. The rotor is so mounted that its periphery has its closest proximity to the inner wall at a point removed about 50 degrees in a clockwise direction from spark plug 60. The rotor is at its furthermost point from the inner wall at a point about 180 degrees in the clockwise direction from the point of the rotor having its closest proximity to the inner wall. As disclosed hereinbefore, a plurality of arcuate slots 27 of predetermined length are formed in the innermost wall. These slots are illustrated in FIGURES 1 and 3. The slots form an inlet means or an intake port to the work chamber from the carburetor-blower means. The arcuate slots or inlet means provide a means and method whereby an explosive mixture of fuel and air enters the work chamber between several of the vanes from the carburetor-blower means as is shown in FIGURE 1. The rotor means is displaced in the counter-clockwise direction as illustrated by arrow 61 in FIGURE 1. During the rotational displacement of the rotor means in the counterclockwise direction, the fuel and air mixture is forced into the work chamber by the blower portion of the carburetor-blower means. It is noted that when proceeding in a counterclockwise direction, the space between the rotor means and the inner wall of the cylindrical means is tapering in nature. Therefore, as the rotor means is displaced in the counterclockwise direction, the appropriate vanes carry therewith the air and fuel mixture in the counterclockwise direction. Due to the tapering shape of the space, through which the fuel and air mixture is carried, the fuel and air mixture is compressed. The maximum compression of the fuel and air mixture is attained at about the point 50 degrees removed in the clockwise direction from the spark plug as illustrated in FIGURE 1. Upon additional rotational displacement of the rotor means, the explosive fuel and air mixture is allowed to decompress slightly at which point ignition of the explosive mixture occurs. A pair of slots 62 formed in the inner wall at an angle each with respect to the other are equally spaced on either side of the spark plug as illustrated in FIGURE 2. The slots arcuately extend about 23 degrees in both the clockwise and counterclockwise direction from the spark plug. One of the purposes of slots 62 is to further mix the fuel air mixture by additional turbulence of the mixture. As disclosed hereinbefore, the initial ignition of the fuel is sufficient to ignite the fuel and air mixture in a continuous fashion as long as the engine is operated. This phenomenon occurs due to several factors operating in conjunction. Slots 62 are of sufficient length to overlie an area determined by at least three adjacent vanes, thereby providing at least two unimpeded channels to the areas determined by the three adjacent vanes so as to provide a means of igniting the fuel air mix associated with said areas. The design is adequate to permit continuous ignition of fuel and air mixture without the necessity of having a continuous spark ignition system. The fuel and air mixture contained behind these areas in the clockwise direction will not ignite for the separation between the tip of the vane and its cooperatively associated tubing and the inner wall is too small to provide an opening through which the exploding fuel and air mixture can pass to ignite the fuel and air mixture therebehind.

Formed on the inner wall 13 and communicating with venturi action exhaust means 64 is a plurality of discharge arcuate slots 65. The counterclockwise motion of the vanes sweeps the combusted fuel and air mixture from the work chamber through the discharge slots to the exhaust means. Hence, after ignition of the fuel and air mixture and its resulting expansion, the residue of the fuel and air mixture is conveyed to the venturi action exhaust means through which it passes to the atmosphere.

As a means and method of reducing gas leakage between the working chamber and any one or all of the radial slots 45, a half ring 66 interfits with a triangular shaped cut out portion 67 formed in the rotor means. The cut out portion 67 is located adjacent each longitudinal side of each vane. One half ring is located on each longitudinal side of the vane as illustrated in FIGURE 1. Each half ring acts as a sealing means between the cooperatively associated vane and the rotor means to thereby prevent leakage of gases between the vanes and the radial slots of the rotor means.

A plurality of lubricating ports 68 are coupled to oil pan 69. The rotary internal combustion engine is properly lubricated by the lubricating ports illustrated in FIGURE 4. Through the lubricating ports lubricating oil is introduced from the oil pan to the engine. The innermost extremities of these ports transmit oil to the outermost recesses of the working chamber. Through these oil ports lubricating oil is introduced under pressure by means of oil pump 95 to the recesses of the engine. It is seen that as the engine is operating, the radial displacement of the vanes in their operatively associated slots in conjunction with centrifugal force, present when the engine is operating, will result in the lubricating oil working moving outwardly from the axis of the rotor means on both extremities thereof to the both longitudinal sides of each vane. The lubricating oil will also move outwardly from the axis of the rotor to the inner of the cylinder wall. It is seen that all interior working parts of the engine will be continuously lubricated by the system of lubricating ports. Oil seals are appropriately located within the engine so as to substantially prevent oil leakage from the engine.

The electrical mechanism for electrically making and breaking the electrical circuit connected to the spark plug is not shown. As disclosed hereinbefore, the initial spark of the spark plug ignites the fuel and air mixture adjacent the spark plug, therefore, an electrical mechanism that would store a suitable charge to cause the spark plug to initiate a spark at the beginning of the operation of the engine would be sufficient. It is seen that there is no ostensible need for a continuous spark ignition means when utilizing the means of the present invention.

FIGURES 5 and 6 illustrate an embodiment of the present invention which includes several novel features not found in the other figures. The rotary internal combustion engine of the embodiment is generally indicated by numeral 10'. The engine is suitably mounted to a support member (not shown) in an acceptable and a conventional manner. As in the first embodiment, the engine includes an apertured, substantially cylindrical shaped means 11' fabricated from a metal or metal alloy having the characteristics of withstanding high temperatures and of good wear resistance such as an alloy metal sold under the trademark Mallory 3, or specially treated aluminum or the like. An internal space 70 is formed between the outer periphery of the cylindrical means 11' and the inner wall 13' of the cylindrical means. The internal space illustrated in FIGURE 5 is for allowing a suitable cooling fluid such as water to flow from fluid inlet 72 through the internal space and out fluid outlet 71. It is seen that a continuous fluid flow through the internal space would aid in conducting heat away from the inner wall 13' thereby promoting the efficiency of the engine.

The inner wall 13' of the hollow cylindrical means is to be elliptical in shape. A work chamber 15' is formed by the inner wall 13' of the cylindrical means and the periphery of the rotor means 16'. Rotatably mounted within the elliptical shaped aperture of the cylindrical means is a rotor means 16'. The rotor means revolves about axis 17', the axis of the hollow cylindrical means. Axis 17' is eccentric with axis 18' of the inner wall, axis 18' is the axis of a plurality of vanes 46'.

The rotor means includes a plurality of spaced predeterminately shaped means 73 each of which includes a peripheral notch 110' for mixing the explosive fuel and air mixture and for maintaining the compression ratio of the engine so that the compression ratio does not exceed a determined limit.

Each of the predeterminately shaped means 73 includes an aperture 74 for receiving a threaded bolt means 75. The threaded bolt means tightly fastens each of the predeterminately shaped means 73 to a plate 76 having integrally formed thereon a plurality of angular fins 77. The threaded bolt means also tightly fasten the means 73 to flange 78 of drive shaft 38'. As illustrated in FIGURE 6 the plate 76 and the flange 78 of the drive shaft are positioned at the opposite open ends of the hollow cylindrical means thereby effectively sealing the extremities of the cylindrical means. As illustrated in FIGURE 6, the radius of the plate 76 and the radius of flange 78 of the drive shaft 38' are substantially greater than the radius of the inner wall, therefore, as the plurality of predeterminately shaped means 73 are tightened to the plate 76 and to the flange 78, the plate and the flange are biased against a resilient sealing ring means 25' seated in each extremity of the cylindrical shaped means thereby effectively sealing the internal portion of the rotory engine from deleterious foreign material. The sealing ring means 25 also provides a controlled condition under which explosion of the fuel and air mixture occurs. The rings are fabricated from any suitable resilient material such as cast iron or the like.

Axis 17' about which the rotor means rotates is determined by the axis of offset portion 28' of a stationary single overhung crank 29'. The axis of crank shaft 30' provides axis 18' about which the elliptical work chamber is formed. The offset portion of the crank and the crank shaft are fixedly coupled together by web 31' to form a unitary single overhung crank. The single overhung crank is fabricated from any suitable metal such as stainless steel or the like.

A seat means 32' includes a portion 33' having an aperture 34' which interfits with extremity 79' of the crank shaft. A bolt 20' interfits with a threaded aperture of portion 33' so that as bolt 20' is tightened into the threaded aperture, seat 32' is fixedly coupled to the crank. Pin 35' of the seat means is eccentric with respect to the axis of the crank shaft. However, pin 35' has its axis concentric with the axis of the offset portion 28'. Pin 35' interfits with an axial recess 80 of the drive shaft means. It will be noted that the seat means is not fixedly coupled to the pin, therefore, the drive shaft rotates independently of the seat means, and hence rotates independently of the stationary crank.

Offset portion 28' of the crank projects through a centrally located aperture of plate 76. It is seen that plate 76 rotates substantially free of the crank, yet allows the crank to provide axial support to the plate.

Angular fins 77 are integral with plate 76. As the angular fins are rotationally displaced, the air associated therewith is displaced in a clockwise direction and forced through suitable means such as conduit means 115 to a carburetor means (not shown). Excess air is displaced through escape means 114. The carburetor means provides the proper mixture of fuel and air to the engine under a predetermined initial pressure. The partially compressed fuel and air mixture enters the working chamber of the engine through intake orifice 81. The carburetor means is fixedly coupled to the engine by any suitable means such as bolts (not shown) or other suitable retaining means.

As disclosed hereinbefore, the rotor means 19' is located within the elliptical work chamber in an eccentric manner with respect to the longitudinal axis of the work chamber. As illustrated in FIGURE 5, the spaced location of the plurality of predeterminately shaped means 73 about axis 17' form rotor means 16'. The spaced location of the plurality of predetermined shaped means forms a plurality of radial slots 45' having as their axis, axis 17'. FIGURE 5 illustrates 16 radial slots but it will be understood that the number of slots may be varied without departing from the scope of the novel invention. The illustrated 16 radial slots are a mere matter of choice to facilitate the description of this embodiment of the present invention. Operatively associated with each slot of the rotor means is a vane 46'. The vanes slide in their respective slots in accordance with the centrifugal force of the engine as the engine is operated.

The means and methods of sealing between any one vane and flange 78 and plate 76 is substantially the same as disclosed hereinbefore with regard to the vanes of FIGURES 1, 3 and 4.

The vanes are fabricated from two separate pieces of metal fixedly coupled together by at least two pins 82 so as to provide a substantially unitary vane. Each vane includes a rectangular blade 83 and an arm 84. As illustrated in FIGURE 6, the rectangular blade has formed therein a centrally located recess interfitting with arm 84. Pins 82 are utilized to fixedly couple the arm to the blade to thereby provide a unitary vane means. The other extremity of the arm is pivotably coupled to ring 85 by peg 86. It is seen that the cross sectional shape of the ring is substantially U-shaped. The ring is rotatably mounted on the crank shaft 30' by bearing means 87. It is seen that the plurality of vanes means have as their axis of rotation, the axis of the crank shaft, that is axis 18'. Each vane means is fabricated from any suitable metal such as titanium, aluminum, machine steel or the like.

In the device of FIGURE 1 it is seen that the roller bearings would rock slightly as the vanes of that device change position with respect to the rotor means. The point of contact of the roller bearing 59 on the camming surface varies from a point substantially under a first longitudinal side to a point substantially under the second longitudinal side. The arcuate extent of the contact of the roller bearing with the camming surface would be approximately the width of a single vane 46. When two surfaces are in contact and one surface changes position with respect to the second surface it is elementary that friction will be developed. Lubricating means will minimize the friction, however, lubrication will not eliminate friction entirely. It is seen that the embodiment of FIGURES 5 and 6 will not develop a rolling friction such as developed by the device of FIGURE 1 for the vane means of the device of FIGURES 5 and 6 are pivotally coupled to ring means 85 by peg 86. The device of FIGURES 5 and 6 would experience less wear than would be experienced by the roller bearing and camming means of FIGURE 1.

An additional benefit realized by the embodiment of FIGURES 5 and 6 not realized by several presently available devices is more advantageous weight distribution thereby further reducing wear. It is seen that by pivotably coupling the vane means 46' to a unitary ring means rotatably coupled to crank shaft 30' and designing the pivotable coupling so as to be in close proximity to crank shaft 30' that any tendency of the vanes to cock is minimized thereby more evenly distributing the weight of the device. The device of FIGURE 1 allows the vanes to cock slightly with respect to axis 18 thereby introducing a slight weight imbalance to the device which has a tendency to increase the wear experienced by the device of FIGURE 1. The tendency of the vanes to cock with respect to the cylinder wall necessitates that the inner wall of both engines be slightly elliptical in shape to compensate therefore. The compensation permits the vanes to cock slightly at various times during the cycle without engaging the inner wall. It will be noted that a small clearance exists between vertical tip 52' of the vane and the wall of the working chamber. The tips or extremities of the vane means do not engage the wall of the working chamber. A tubing 53' interfits with and is retained in place by a recess in the tip 52' of the vane means. The tubing is fabricated from any suitable material such as stainless steel or the like. The purpose of the tubing is to ride in close proximity to the inner wall to thereby effectively seal the area between the tip of the vane and the inner wall so that substantially no leakage of gases occurs through this area. The crank 29' and parts fixedly coupled thereto do not rotate but rather are stationary with respect to the moving parts of the rotary internal combustion engine illustrated in FIGURES 5 and 6. The vane means ride in close proximity to but not engaging with the inner wall 13' thereby achieving substantially the same result as the vanes of several presently available devices without experiencing the excessive wear between the vanes and the inner wall of the available devices yet provide an output having substantially the same magnitude of output power.

A spark plug 60' is mounted on the engine so that the initial spark generated thereby is transmitted to the work chamber. The rotor means 16' is mounted so that its closest proximity to the inner wall is at a point approximately 50 degrees in a counterclockwise direction from the spark plug. Spaced approximately 180 degrees from the point to close proximity to the inner wall is the point at which the rotor means is spaced furthest from the inner wall.

The rotor is initially displaced in the clockwise direction as shown by arrow 88 by any suitable means such as by hand. Angular fins 77 rotate so as to pull air through filter 89 and thereafter blow the air into a carburetor (not shown) through a suitable conduit means 115. The fuel and air are mixed and thereafter blown into the working chamber through intake orifice 81. The work chamber tapers in shape in the clockwise direction. Therefore, as the rotor means 16' is displaced in the clockwise direction, the vane means pushes the fuel and air mixture therealong in the clockwise direction. Due to the tapering shape of the space between the rotor means and the inner wall, the fuel and air mixture is compressed. At a point spaced approximately about 30 degrees of additional rotation whereupon the compressed fuel and air mixture is allowed to expand or decompress at which point ignition of the explosive mixture occurs. A pair of slots 62' are formed in the inner wall at an angle each with respect to the other. The slots are equally spaced on either side of the spark plug and arcuately extend therefrom approximately 60 degrees in the clockwise direction. An initial spark is sufficient to ignite the fuel and air mixture as long as the fuel and air mixture is present within the explosion space of the work chamber. As disclosed hereinbefore, the fuel and air mixture explodes in a continuous fashion so long as the engine is operational. One of the several reasons for this occurrence is that the slots 62' overlie the area determined by approximately four (4) of the adjacent vane means thereby providing unimpeded channel coupling between the four adjacent areas thus maintaining constant explosion of the fuel and air mixture within said areas by means of affording a flashback path through slots 62'. The design is adequate to provide continuous ignition of the fuel and air mixture without the necessity of providing a continuous spark ignition system. The fuel and air mixture retained counterclockwise from these explosion areas will not ignite for the separation between the tip of the vane and the inner wall is too small to provide an adequate opening through which the exploding and therefore expanding fuel and air mixture can pass to ignite the fuel and air mixture therebehind.

Displaced approximately 45 degrees in the clockwise direction from the extremity of slots 62' is exhaust orifice 89. The clockwise motion of the vane means sweeps the combusted fuel and air mixture from the work chamber. A second orifice or vacuum exchange orifice 90 is located about 15 degrees clockwise from the exhaust orifice. The location of the vacuum exchange orifice with respect to the exhaust orifice and a separation of about 23 degrees between the vanes permits additional scavenge of the combusted fuel and air mixture by means of creating a vacuum behind the appropriate vane means.

A plurality of lubricating ports 68', an oil pan (not shown) and an oil pump (not shown) are utilized to provide lubricating oil to the engine in substantially the same manner as disclosed in the discussion of FIGURES 1, 3 and 4.

As noted hereinbefore the engine of FIGURES 1, 3 and 4 and the engine of FIGURES 5 and 6 have vanes that have a tendency to cock at an angle with respect to the inner wall, therefore, the effective length of the vane varies in accordance with the position of the vane within the work chamber. This is one of the reasons for the work chamber being slightly elliptical in shape.

Figure 7:
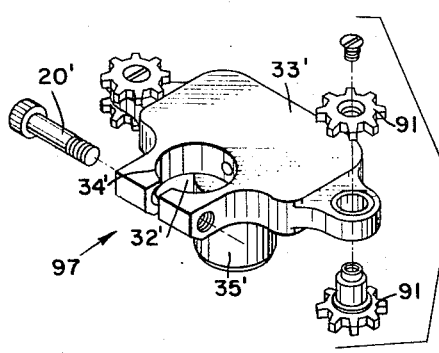
FIGURE 7 is a perspective view of a synchronizing means which is an integral part of the embodiment of FIGURE 6.

A problem of the vanes cocking also exists when the engine de-accelerates. It is seen that since the mass of the rotor is greater than the mass of the plurality of the vane means there is a more rapid slow down of one of the masses than the other of the masses thereby causing the vanes to cock. With the cocking of the vane means, it is possible that the spacing would be sufficient to allow ignition of the fuel and air mixture in the counterclockwise direction thereby combusting the explosive mixture before it is compressed. To eliminate this problem a means and method were devised to synchronize the de-acceleration of the rotor mass and the vane mass to prevent cocking of the vane means. It is seen that synchronizing means 94 would substantially prevent cocking of the vanes as the engine accelerated. The synchronizing means includes two pairs of fixedly coupled pinions rotatably coupled to opposite sides of seat means 32' as illustrated in FIGURE 7. One each of the pair of pinions meshes with gear 92. Gear 92 is fixedly coupled to ring 85 and therefore rotatable therewith. A second gear 93 is fixedly coupled to flange 78 so as to have the same axis as the flange and hence the same axis as the drive shaft. The other pinion of said pairs of pinions meshes with the second gear. It is seen that the rotor means which is fixedly coupled to the flange which de-accelerate at the same rate of speed as does the vane means thereby substantially preventing cocking of the vane means.

Having described the structure of the present invention the cooperation between the described structural elements will be disclosed.

Figure 8:
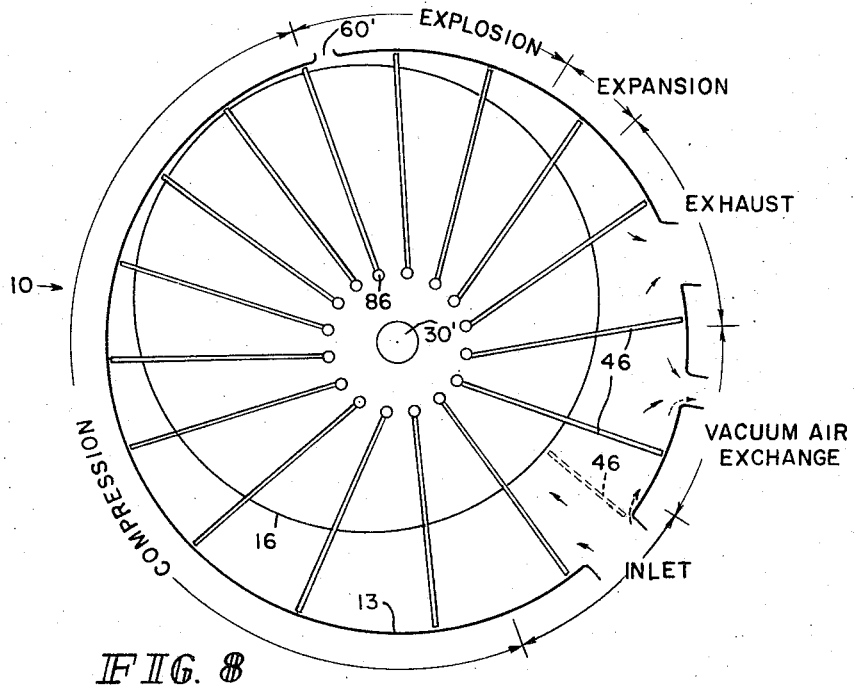
FIGURE 8 illustrates the various major portions of a cycle of the rotary internal combustion engine of the present invention.
Figure 9:
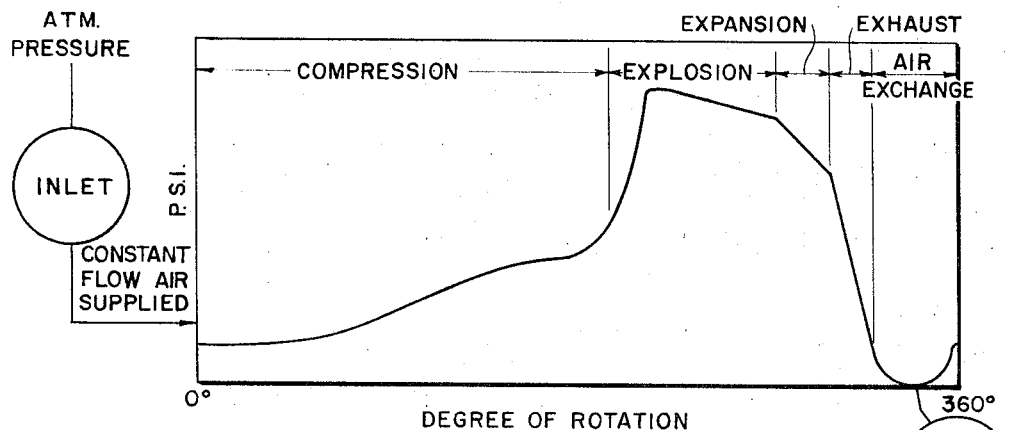
FIGURE 9 is a graphic representation of the degree of rotation versus pounds per square inch (p.s.i.) developed by the present invention during selected portions of the rotor's cycle.

It is seen that drive shaft is rotationally displaced in the predetermined direction as are the end plates or sealing means and the rotor means. The initial movement of the drive shaft may be imparted thereto by any suitable means such as an electric starting motor of the type commonly utilized with internal combustion engines. The initial rotational displacement of the rotor means will cause the vanes operatively associated with the rotor means to induce a directional flow of the fuel and air mixture through the arcuate intake slots from the carburetor means and through the blower means. It is seen that the flow of the fuel and air mixture will be substantially continuous so long as the engine is operating. As the fuel and air mixture enters the working chamber, it will be compressed due to the tapering nature of the area located between the rotor means and the inner wall in a space called the compression space of the work chamber. The mixture is compressed between the rotor means, the inner wall and the operatively associated vanes. The compression reaches a maximum about 150 degrees from the intake slots. Thereafter the air fuel mixture is permitted to expand slightly in a space called a decompression space of the work chamber and at the same time the vanes carry the fuel and air mixture to the vicinity of a spark plug. At a predetermined point the spark plug is energized, thereby igniting the combustible fuel and air mixture in a space called an explosion space of the work chamber. The combustion of the mixture causes a rapid increase in the pressure contained within this portion of the working chamber as well as an increase in the temperature of this portion of the working chamber. The expanding gases expand into and through a space called the expansion space of the work chamber. The resulting increase in pressure and temperature is in accordance with well known scientific principles. As a result of the substantially increased pressure on the vane close to the spark plug in a determined direction, the vane is disposed in the determined direction. Decompression of the combusted fuel and air mixture takes place due to the widened area between the rotor means and the inner wall. The pressure of the combusted fuel and air mixture causes the vanes to move in the counterclockwise direction until such time as the combusted fuel and air mixture reaches the discharge slots where the residue of the combusted fuel and air mixture is scavenged from the working chamber. This space of the work chamber is called the exhaust space. FIGURE 8 of the drawings illustrates the approximate location of the aforementioned spaces within the engine. FIGURE 9 is a graphic representation of a complete revolution of the motor illustrating an approximation of the pounds per square inch (p.s.i.) curve versus degree of rotation of the engine.

In summation, the present invention describes a means for continuously igniting an air-fuel mixture in which a continuous spark system becomes unnecessary. In the present system the constant firing in the explosion chamber is done by a multiplicity of notches and includes a vacuum type of exhaust mechanism for scavenging the exhaust gases.

Functionally and constructively a camming means and bearing surfaces cooperate with the vanes by riding on cam tracks and by so doing are predeterminately positioned in relationship to the inner wall of the cylinder. Further the invention discloses an engine having a stationary singly overhung crank. As a result thereof, the driveshaft of the engine is directly coupled to the sealing means closing either extremity of the engine. A second embodiment of the aforesaid invention is constructed for pivotably coupling the vanes of the motor to the ring means. This establishes a more efficient balancing of the operating parts of the engine and substantially reduces causes for wear therein and hence lessens the cocking effect of the vane means by presenting a tangential relationship to the inner wall of this cylinder. Additionally by the construction and novel cooperation of the components of the engine and since the engine fires on the decompression portion of the firing cycle, a cooler operation of the engine is afforded without sacrifice of powder. Again, the peripheral notches allow for more uniform mixture of fuel and air. These notches also reduce untoward effects of the compression ratio of the motor.

A second embodiment of the invention further includes means for synchronizing the rotational displacement of the rotor means and a ring of the engine, so as to increase the efficiency of the engine by preventing cocking of the vanes during acceleration and deceleration of the motor.

While the invention is illustrated and described in its preferred embodiments, it will be understood that modifications and variations may be effected without departing from the scope of the novel concepts of this invention and as set forth in the appended claims.

Having thus described our invention, we claim:

1. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; means rotatably journalled to said crank means for maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited, said ignited mixture expanding causing additional rotational displacement of said rotor means and said cooperatively associated vanes; and an outlet means communicating with said exhaust space for scavenging a residue of said mixture present within said exhaust space.

2. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; means rotatably journalled to said crank means for maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosive space, said ignited mixture expanding causing additional rotational displacement of said rotor means and said cooperatively associated vanes; and an outlet means communicating with said exhaust space for scavenging a residue of said mixture present within said exhaust space.

3. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means, said rotor means having as an axis an axis of said crank means; a plurality of sealing means fixedly connected to said rotor means and overlying each extremity of said cylindrical means; a work chamber formed by the cooperative relationship of said rotor means and said inner wall, said work chamber having a compression space, an explosion space and an exhaust space; a plurality of spaced radial slots carried by said rotor means; vanes slidably carried in said slots, said vanes including tips; means rotatably journalled to said crank means for maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and an outlet means communicating with said exhaust space for scavenging a residue of said mixture present within said exhaust space.

4. A rotary internal combustion engine comprising: a hollow cylindrical means having an elliptical shaped inner wall, the axis of said inner wall eccentric with said cylindrical means; a single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; means rotatably journalled to said crank shaft for maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and an outlet means communicating with said exhaust space for scavenging a residue of said mixture present within said exhaust space.

5. A rotary internal combustion engine comprising: a hollow cylindrical means having an elliptical shaped inner wall, the axis of said inner wall eccentric with said cylindrical means; a single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion; a plurality of sealing means fixedly connected to said rotor means and overlying each extremity of said cylindrical means; a work chamber formed by the cooperative relationship of said rotor means and said inner wall, said work chamber having a compression space, a decompression space, an explosion space, an expansion space, and an exhaust space; a plurality of spaced radial slots carried by said rotor means; vanes slidably carried in said slots, said vanes including tips; means rotatably journalled to said crank shaft for maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding into said expansion space against an increased surface area of said vanes causing additional rotational displacement of said rotor means and said cooperatively associated vanes; and an outlet means communicating with said exhaust space for scavenging a residue of said mixture present within said exhaust space.

6. A rotary internal combustion engine comprising: a hollow cylindrical means having an elliptical shaped inner wall, the axis of said inner wall eccentric with said cylindrical means; a stationary single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion, said rotor means having a plurality of spaced peripheral notches for further mixing an explosive mixture and for reducing the compression ratio of said engine; a plurality of sealing means fixedly connected to said rotor means and overlying each extremity of said cylindrical means; a work chamber formed by the cooperative relationship of said rotor means and said inner wall, said work chamber having a compression space, a decompression space, an explosion space, an expansion space, and an exhaust space; a plurality of spaced radial slots carried by said rotor means; vanes slidably carried in said slots, said vanes including tips; means rotatably journalled to said crank shaft means for maintaining said tips of said vanes predeterminately spaced from said inner wall; an inlet means communicating with said compression space for allowing said explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding into said expansion space against an increased surface area of said vanes causing additional rotational displacement of said rotor means and said cooperatively associated vanes; and an outlet means and a vacuum exhaust means communicating with said exhaust space for vacuum scavenging a residue of said mixture present within said exhaust space.

7. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a recess formed within said rotor means; a camming means eccentrically mounted in said cylindrical means, said camming means rotatably journalled to said crank means and carried within said recess, said camming means including a plurality of cam tracks; a plurality of bearing means fixedly coupled to said vane means, said bearing means riding on said cam tracks for maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited, said ignited mixture expanding causing additional rotational displacement of said rotor means and said cooperatively associated vanes; and an outlet means communicating with said exhaust space for scavenging a residue of said mixture present within said exhaust space.

8. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means, said rotor means having as an axis an axis of said crank means; a plurality of sealing means fixedly connected to said rotor means and overlying each extremity of said cylindrical means; a work chamber formed by the cooperative relationship of said rotor means and said inner wall, said work chambing having a compression space, an explosion space, and an exhaust space; a plurality of spaced radial slots carried by said rotor means; vanes slidably carried in said slots, said vanes including tips; a radial recess formed within said rotor means; a camming means eccentrically mounted in said cylindrical means; said camming means rotatably journalled to said carnk means and carried within said radial recess, said camming means including a plurality of cam tracks; a plurality of bearing means fixedly coupled to said vane means, said bearing means riding on said cam tracks for maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and an outlet means communicating with said exhaust space for scavenging a residue of said mixture present within said exhaust space.

9. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a recess formed within said rotor means; a camming means eccentrically mounted in said cylindrical means, said camming means rotatably journalled to said crank means and carried within said recess, said camming means including a plurality of cam tracks; a plurality of bearing means fixedly coupled to said vane means, said bearing means riding on said cam tracks for maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and an outlet means communicating with said exhaust space for scavenging a residue of said mixture present within said exhaust space.

10. A rotary internal combustion engine comprising: a hollow cylindrical means having an elliptical shaped inner wall, the axis of said inner wall, the axis of said inner wall eccentric with said cylindrical means; a single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a radial recess formed within said rotor means; a camming means eccentrically mounted in said cylindrical means, said camming means rotatably journalled to said crank shaft and carried within said radial recess, said camming means including a plurality of cam tracks; a plurality of bearing means fixedly coupled to said vane means, said bearing means riding on said cam tracks for maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and an outlet means communicating with said exhaust space for scavenging a residue of said mixture present within said exhaust space.

11. A rotary internal combustion engine comprising: a hollow cylindrical means having an elliptical shaped inner wall, the axis of said inner wall eccentric with said cylindrical means; a single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion; a plurality of sealing means fixedly connected to said rotor means and overlying each extremity of said cylindrical means; a work chamber formed by the cooperative relationship of said rotor means and said inner wall, said work chamber having a compression space, a decompression space, an explosion space, an expansion space, and an exhaust space; a plurality of spaced radial slots carried by said rotor means; vanes slidably carried in said slots, said vanes including tips; a radial recess formed within said rotor means; a camming means eccentrically mounted in said cylindrical means, said camming means rotatably journalled to said crank shaft and carried within said radial recess, said camming means including a plurality of cam tracks; a plurality of bearing means fixedly coupled to said vane means, said bearing means riding on said cam tracks for maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding into said expansion space against an increased surface area of said vanes causing additional rotational displacement of said rotor means and said cooperatively associated vanes; and an outlet means communicating with said exhaust space for scavenging a residue of said mixture present within said exhaust space.

12. A rotary internal combustion engine comprising: a hollow cylindrical means having an elliptical shaped inner wall, the axis of said inner wall eccentric with said cylindrical means; stationary single overhung crank means including a crank shaft means mounted eccentrically in said cylindrical means and an offset portion mounted concentrically in said cylindrical means; a rotor means mounted concentrically in said cylindrical means, said rotor means having as an axis of the axis of said offset portion, said rotor means including a plurality of spaced peripheral notches for further mixing an explosive mixture and for reducing the compression ratio of said engine; a plurality of sealing means fixedly connected to said rotor means and overlying each extremity of said cylindrical means; a work chamber formed by the cooperative relationship of said rotor means and said inner wall, said work chamber having a compression space, a decompression space, an explosion space, an expansion space, and an exhaust space; a plurality of spaced radial slots carried by said rotor means; vanes slidably carried in said slots, said vanes including tips; a radial recess formed within said rotor means; a camming means eccentrically mounted in said cylindrical means, said camming means rotatably journalled to said crank shaft and carried within said radial recess, said camming means including a plurality of cam tracks; a plurality of bearing means fixedly coupled to said vane means, said bearing means riding on said cam tracks for maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited a plurality of arcuate slots formed in said inner wall for maintaining continuous ignition of said mixture within said explosion space, said ignited mixture expanding into said expansion space against an increased surface area of said vanes causing additional rotational displacement of said rotor means and said cooperatively associated vanes; and an outlet means and a vacuum exhaust means communicating with said exhaust space for vacuum scavenging a residue of said mixture present within said exhaust space.

13. A rotary internal combustion engine comprisng: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said motor means and said inner wall, said work chamber having a compression space, an explosion space, and an exhaust space; a plurality of spaced radial slots carried by said rotor means; vanes slidably carried in said slots, said vanes including tips; a ring means rotatably journalled to said crank means, said ring means including peg means coupling said plurality of vanes to said ring means, said ring means maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited, said ignited mixture expanding causing additional rotational displacement of said rotor means and said cooperatively associated vanes; and an outlet means communicating with said exhaust space for scavenging a residue of said mixture present within said exhaust space.

14. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a ring means rotatably journalled to said crank means, said ring means including peg means coupling said plurality of vanes to said ring means, said ring means maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited, said ignited mixture expanding causing additional rotational displacement of said rotor means and said cooperatively associated vanes; a synchronizing means for synchronizing said rotational displacement of said rotor means and said ring means; and an outlet means communicating with said exhaust space for scavenging a residue of said mixture present within said exhaust space.

15. A rotary internal combustion engine comprising: a hollow cylindrical means having an inner wall, the axis of said inner wall eccentric with said cylindrical means; a single means mounted in said cylindrical means; a rotor means mounted concentrically in said cylindrical means; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a ring means rotatably journalled to said crank means, said ring means including peg means coupling said plurality of vanes to said ring means, said ring means maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; a synchronizing means for synchronizing said rotational displacement of said rotor means and said ring means; and an outlet means communicating with said exhaust space for scavenging a residue of said mixture present within said exhaust space.

16. A rotary internal combustion engine comprising: a hollow cylindrical means having an inner wall, the axis of said inner wall eccentric with said cylindrical means; a crank means mounted in said cylindrical means; a rotor means mounted concentrically in said cylindrical means, said rotor means having as an axis an axis of said crank means; a plurality of sealing means fixedly connected to said rotor means and overlying each extremity of said cylindrical means; a work chamber formed by the cooperative relationship of said rotor means and said inner wall, said work chamber having a compression space, an explosion space, an expansion space, and an exhaust space; a plurality of spaced radial slots carried by said rotor means; vanes slidably carried in said slots, said vanes including tips; a ring means rotatably journalled to said crank means, said ring means including peg means pivotably coupling said plurality of vanes to said ring means, said ring means maintaining said tips of said vanes spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; a synchronizing means for synchronizing said rotational displacement of said rotor means and said ring means; and an outlet means communicating with said exhaust space for scavenging a residue of said mixture present within said exhaust space.

17. A rotary internal combustion engine comprising: a hollow cylindrical means having an elliptical shaped inner wall, the axis of said inner wall eccentric with said cylindrical means; a single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a ring means rotatably journalled to said crank shaft, said ring means including peg means pivotably coupling said plurality of vanes to said ring means, said ring means maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; a synchronizing means for synchronizing said rotational displacement of said rotor means and said ring means; and an outlet means communicating with said exhaust space for scavenging a residue of said mixture present within said exhaust space.

18. A rotary internal combustion engine comprising: a hollow cylindrical means having an elliptical shaped inner wall, the axis of said inner wall eccentric with said cylindrical means; a single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion; a plurality of sealing means fixedly connected to said rotor means and overlying each extremity of said cylindrical means; a work chamber formed by the cooperative relationship of said rotor means and said inner wall, said work chamber having a compression space, a decompression space, an explosion space, an expansion space, and an exhaust space; a plurality of spaced radial slots carried by said rotor means; vanes slidably carried in said slots, said vanes including tips; a ring means rotatably journalled to said crank shaft, said ring means including peg means pivotably coupling said plurality of vanes to said ring means, said ring means maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding into said expansion space against an increased surface area of said vanes causing additional rotational displacement of said rotor means and said cooperatively associated vanes; a synchronizing means for synchronizing said rotational displacement of said rotor means and said ring means; and an outlet means communicating with said exhaust space for scavenging a residue of said mixture present within said exhaust space.

19. A rotary internal combustion engine comprising: a hollow cylindrical means having an elliptical shaped inner wall, the axis of said inner wall eccentric with said cylindrical means; a stationary single overhung crank means including a crank shaft means mounted eccentrically in said cylindrical means and an offset portion mounted concentrically in said cylindrical means; a rotor means mounted concentrically in said cylindrical means, said rotor means having as an axis the axis of said offset portion, said rotor means having a plurality of spaced peripheral notches for further mixing an explosive mixture and for reducing the compression ratio of said engine; a plurality of sealing means fixedly connected to said rotor means and overlying each extremity of said cylindrical means; a work chamber formed by the cooperative relationship of said rotor means and said inner wall, said work chamber having a compression space, a decompression space, an explosion space, an expansion space, and an exhaust space; a plurality of spaced radial slots carried by said rotor means; vanes slidably carried in said slots, said vanes including tips; a ring means rotatably journalled to said crank shaft, said ring means including peg means pivotably coupling said plurality of vanes to said ring means, said ring means maintaining said tips of said vanes predeterminately spaced from said inner wall; an inlet means communicating with said compression space for allowing an explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding into said expansion space against an increased area of said vanes causing additional rotational displacement of said rotor means and said cooperatively associated vanes; a synchronizing means for synchronizing said rotational displacement of said rotor means and said ring means; and an outlet means and a vacuum exhaust means communicating with said exhaust space for vacuum scavenging a residue of said mixture present within said exhaust space.

20. A rotary internal combustion engine comprising: a hollow cylindrical means having an inner wall; a stationary crank means mounted in said cylindrical means; a rotor means mounted in said cylindrical means, said rotor means including peripheral notches for mixing an explosive mixture; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; means rotatably journalled to said crank means for maintaining said tips of said vanes spaced from said inner wall; an inlet means communicating with said compression space for allowing said explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and a vacuum exhaust means communicating with said exhaust space for vacuum scavenging a residue of said mixture present within said exhaust space.

21. A rotary internal combustion engine comprising: a hollow cylindrical means having an inner wall; a stationary crank means mounted in said cylindrical means; a rotor means, mounted in said cylindrical means, said rotor means including peripheral notches for mixing an explosive mixture; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a camming means mounted in said cylindrical means, said camming means rotatably journalled to said crank means and carried within said rotor means, said camming means including a plurality of cam tracks; a plurality of bearing means fixedly coupled to said vane means, said bearing means riding on said cam tracks so that said tips of said vanes are predeterminately spaced from said inner wall; an inlet means communicating with said compression space for allowing said explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing additional rotational displacement of said rotor means and said cooperatively associated vanes; and a vacuum exhaust means communicating with said exhaust space for vacuum scavenging a residue of said mixture present within said exhaust space.

22. A rotary internal combustion engine comprising: a hollow cylindrical means having an inner wall; a stationary crank means mounted in said cylindrical means; a rotor means mounted in said cylindrical means, said rotor means including peripheral notches for mixing an explosive mixture; a plurality of sealing means fixedly connected to said rotor means and overlying each extremity of said cylindrical means; a work chamber formed by the cooperative relationship of said rotor means and said inner wall, said work chamber having a compression space, an explosion space, and an exhaust space; a plurality of spaced radial slots carried by said rotor means; vanes slidably carried in said slots, said vanes including tips; a ring means rotatably journalled to said crank shaft, said ring means including means for pivotably coupling said plurality of vanes to said ring means, said ring means maintaining said tips of said vanes predeterminately spaced from said inner wall; an inlet means communicating with said compression space for allowing said explosive mixture to enter said compression space through said inlet means, said mixture compressed by rotational displacement of said rotor means and said cooperatively associated vanes, further rotational displacement of said rotor means and said cooperatively associated vanes causing said mixture to be slightly decompressed and ignited; a plurality of arcuate slots formed in said inner wall for maintaining continuous ignition of said mixture within said explosion space, said ignited mixture expanding causing rotational displacement of said rotor means and said cooperatively associated vanes; a means for synchronizing said rotational displacement of said rotor means and said ring means; and a vacuum exhaust means communicating with said exhaust space for vacuum scavenging a residue of said mixture present within said exhaust space.

References Cited by the Examiner
UNITED STATES PATENTS 1,427,692  8/1922  Mahon et al. _____ 123—16
2,193,178  3/1940  Laythorpe.

MARK NEWMAN, *Primary Examiner.*

F. T. SADLER, *Assistant Examiner.*